United States Patent
Webb et al.

(10) Patent No.: US 9,652,867 B2
(45) Date of Patent: May 16, 2017

(54) GRAIN GENERATION AND BLENDING

(71) Applicant: Apple Inc., Cupertino, CA (US)

(72) Inventors: Russell Y. Webb, San Jose, CA (US);
Garrett M. Johnson, San Francisco, CA (US); Alexis Gatt, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 482 days.

(21) Appl. No.: 14/058,097

(22) Filed: Oct. 18, 2013

(65) Prior Publication Data

US 2015/0113472 A1    Apr. 23, 2015

(51) Int. Cl.
*G06T 11/00* (2006.01)
*G06F 3/0484* (2013.01)
*G06T 5/00* (2006.01)

(52) U.S. Cl.
CPC ........ *G06T 11/001* (2013.01); *G06F 3/04847* (2013.01); *G06T 5/00* (2013.01); *G06T 2200/24* (2013.01); *G06T 2207/10004* (2013.01); *G06T 2207/10024* (2013.01); *G06T 2207/20204* (2013.01); *G06T 2207/20221* (2013.01)

(58) Field of Classification Search
CPC ...... G06F 3/00; G06F 3/04845; G06F 9/4443; G06F 3/04847; G06T 2207/10004; G06T 5/003; G06T 5/002; G06T 11/00; G06T 11/001; G06T 5/50; G06T 2207/20204; G06T 1/00
USPC .............. 715/781; 345/419; 382/112, 167
See application file for complete search history.

(56) References Cited

U.S. PATENT DOCUMENTS

| | | | |
|---|---|---|---|
| 5,641,596 A * | 6/1997 | Gray et al. | 430/21 |
| 2008/0298678 A1 * | 12/2008 | Kang | 382/167 |
| 2010/0118186 A1 * | 5/2010 | Sakagami | 348/453 |
| 2010/0166335 A1 * | 7/2010 | Balram et al. | 382/263 |

OTHER PUBLICATIONS

Naryskin, Mastering Lightroom: How to Add Film Grain, Feb. 6, 2013, photographlife.com, pp. 1-11, pertinent pp. 1-4, https://photographylife.com/mastering-lightroom-how-to-add-film-grain.*
Jeff, Is ISO part of exposure? Round II, Re: Why not relabel the 'exposure slider' as ISO?, Sep 22, 2013, Digital Photography Review, pp. 1-5, pertinent pp. 1, http://www.dpreview.com/forums/post/52208279.*

* cited by examiner

*Primary Examiner* — Li Sun
*Assistant Examiner* — Terri Filosi
(74) *Attorney, Agent, or Firm* — Blake Jackson; Page Ponsford; DLA Piper LLP US

(57) ABSTRACT

A method and system for providing a dynamic grain effect tool for a media-editing application that generates a grain effect and applies the grain effect to a digital image. The application first generates a random pixel field for the image based on a seed value. The application then generates a film grain pattern for the image by consecutively applying a blurring function and an unsharp masking function, based on an ISO value, to the randomly generated pixel field. The application then blends the grain field with the original image by adjusting each pixel based on the value of the corresponding pixel location in the grain field. The application then adjusts the grain amount in the previously generated full-grain image by receiving a grain amount value from a user and applying this value to the full-grain image.

19 Claims, 11 Drawing Sheets

GRAIN GENERATION AND BLENDING

BACKGROUND

Before the introduction of digital photography to the modern digital world, photographs were made by exposing light sensitive photographic films and applying chemical photographic processes to the films in darkrooms to develop and stabilize images. Such exposure and chemical processing together with the physical structure of the film made the traditional photographs look different than today's digital images. One such difference is elimination of film grain in digital photographs. Film grain is a random optical texture that appears in film during the development process. The grains seen in the traditional photos are actually physical structures of the photosensitive particles in the film which have a direct relationship with the film speed or the sensitivity of camera's sensor to a given amount of light (the "ISO"). Because faster films inherently need larger photosensitive crystals, the faster the film speed is, the bigger the grain particles need to be to capture more photons.

Despite the fact that grain is an artifact, it has a very distinctive look and many people lament the loss of this element of the photography experience. Film grain gives an artistic and authentic look to the photograph, in particular to black and white photos. Additionally, if a photo looks blurry, film grain can ameliorate the level of blurriness in the photo. In digital cameras, the closest physical equivalents to film grain are the individual elements of the image sensor (e.g., a charge-coupled device ("CCD") cell). Unfortunately, pixels from a digital image sensor are organized in straight lines. These straight lines' artifacts may be more irritating to the viewer rather than pleasing as the randomly arranged film grains are. For these reasons, many new image-editing applications have tried to simulate the grain effect of traditional photography in digital photos.

Many of current image-editing applications apply a film grain overlay to the digital image, which essentially adds film noise characteristics to the digital image. However, overlaying film grain often affects dark and bright tonal regions of the digital image. For instance, superimposed graininess often alters the depth of black in the image and is disturbingly visible (appearing artificial) in the brighter tonal region of the image. As a result, the graininess created by simply overlaying film grain on the digital image is often not as visually pleasing as the film grain produced in a natural and traditional process. Additionally, in many of the media-editing applications that are currently available in the market, the grain layer that is generated to be applied to the photo is a static layer (i.e., is not generated dynamically) that has many additional artifacts such as streaks, bars, and other types of noise. These additional and undesired artifacts are mostly generated and appear during the grain layer generation process.

BRIEF SUMMARY

For an image-editing application that allows users to view and edit images, some embodiments of the invention provide a grain effect tool that generates a dynamic grain effect and applies the grain effect to a digital image (e.g., a photograph, a video clip, etc.). The application of some embodiments first generates a dynamic grain field or pattern for a digital image when the grain effect tool is activated and then blends the image with the generated random grain field in order to generate a realistic grainy image (e.g., free of streaks, stripes, etc.) which resembles traditional photos that were developed from photographic films.

In order to generate a dynamic grain field that is free of extra noise (e.g., streaks, bars, etc.), the application of some embodiments generates a random pixel field based on the dimensions of the original image and an initial variable (the "seed"). The application of some embodiments obtains the seed from a computing device on which the application runs. The application then generates a grain field for the image by consecutively applying a blurring function and an unsharp masking function to the randomly generated pixel field. The settings for the blurring and unsharp masking functions, in some embodiments, are calculated by interpolating values in a table based on a film speed variable (ISO). In some embodiments, a user sets the ISO variable. The combination of 1) generating a random pixel field based on a seed value and 2) applying the blurring and unsharp masking functions to the random pixel field based on different ISO values, results in creation of a dynamic grain field which has a different grain shape and pattern for each different image.

The application of some embodiments then adjusts the original image based on the resulting grain field in order to generate a full-grain image. In some embodiments, the application generates the full-grain image by applying a particular adjustment variable (e.g., a gamma adjustment) to the pixels of the image. In some embodiments, different gamma values are used for different pixels. The gamma value applied to a pixel, in some embodiments, is calculated based on the luminance value of the pixel in the original image. The application of some embodiments then modifies the gamma adjusted pixel value based on the value of a corresponding pixel in the grain field. The application then applies an inverse of the original gamma adjustment to the modified pixel. Applying the gamma adjustment, modification, and inverse gamma adjustment to the image results in the appearance of a grain pattern in the full-grain image. The grain pattern produced by such an application is very similar to the grain pattern of traditional photography.

The application of some embodiments applies a grain amount, which can be received from the user, to the previously generated full-grain image in order to adjust the graininess (i.e., grain's strength) of the image. For adjusting the graininess of the image, the application of some embodiments determines a weighted average of the original image and the full-grain image, basing the weight on the received grain amount in order to render the desired grainy image.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For an image-editing application that allows users to view and edit images, some embodiments of the invention provide a grain effect tool that generates a dynamic grain effect and applies the grain effect to a digital image (e.g., a photograph, a video clip, etc.). The application of some embodiments first generates a dynamic grain field or pattern for a digital image when the grain effect tool is activated and then blends the image with the generated random grain field in order to generate a realistic grainy image (e.g., free of streaks, stripes, etc.) which resembles traditional photos that were developed from photographic films.

Figure 1:
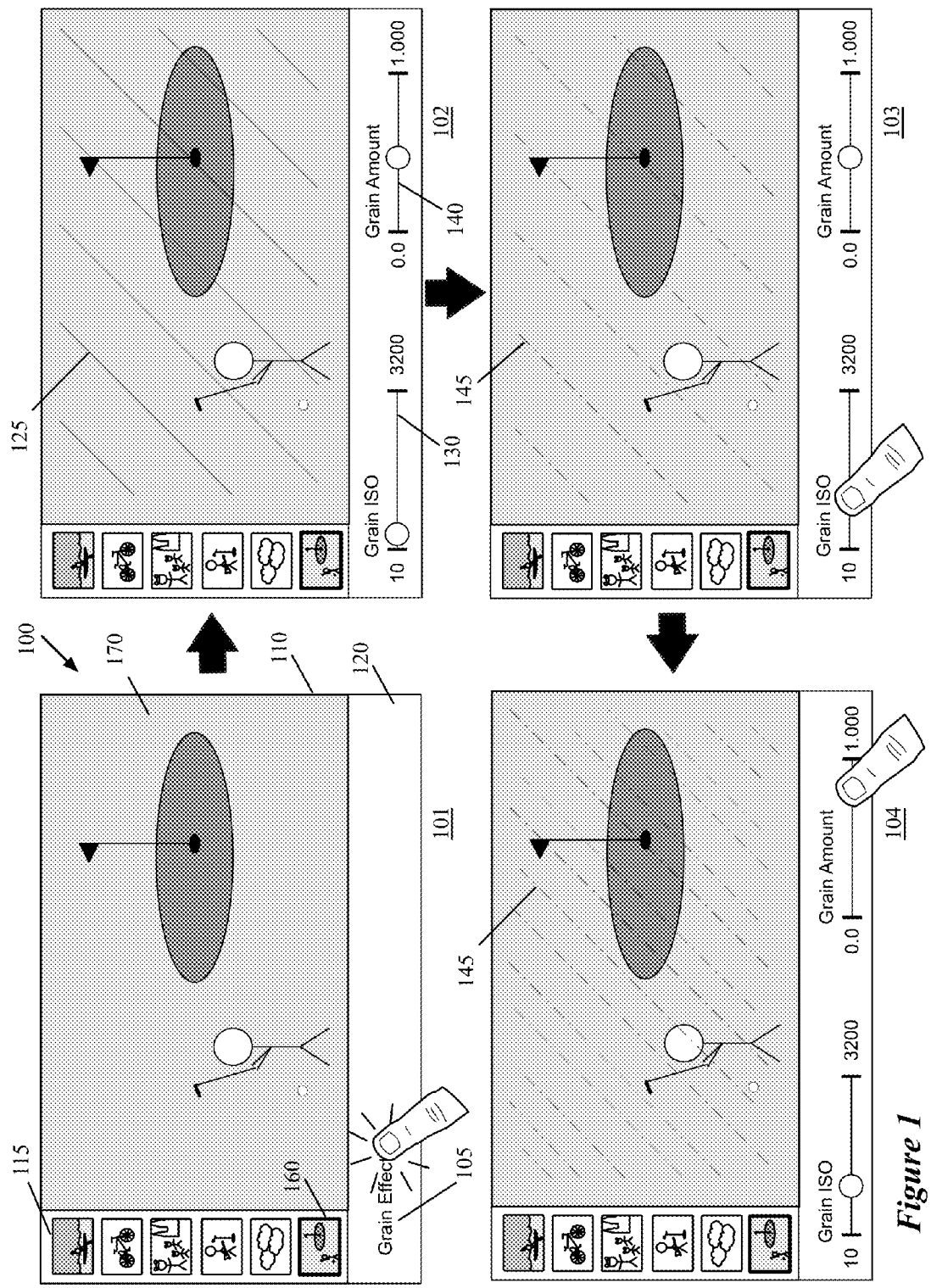
FIG. 1 illustrates an image-editing application that provides a grain effect tool for applying a dynamic grain effect to a digital image.

For some embodiments, FIG. 1 illustrates an image-editing application that provides a grain effect tool for applying a dynamic grain effect to a digital image. Specifically, the figure illustrates the application's graphical user interface (GUI) 100 in four operational stages 101-104. The four stages 101-104 illustrate how to activate a grain effect tool in the image-editing application and applying different grain effects to a digital photo using different amounts of ISO and grain. The GUI 100 of FIG. 1 includes an image viewing area 110, a thumbnail display area 115, and an image effects menu area 120.

The thumbnail display area 115 displays a collection of thumbnails of images that are available for editing using the image-editing application. When the user selects a thumbnail (e.g., by tapping on the thumbnail image on a device with touch-sensitive screen) in the thumbnail display area 115, the image-editing application selects the image that is represented by the selected thumbnail and displays the image in the image viewing area 110. The images in some embodiments are digital photographic images taken originally by a digital photographic device (e.g., a digital camera), digitally scanned photographic images, images taken by a mobile device's camera, images downloaded from a network, or any images digitally produced.

The image viewing area 110 allows the user to view the current state of an image being displayed. In some embodiments, the image-editing application displays an image in its original form inside the image viewing area 110 when the image is loaded from a storage medium into the application. Once a particular effect has been applied to the image, the user can view the resulting image in the image viewing area 110. In this example, the subject image 170 which is a photo of a person playing golf is currently loaded into the image-editing application and displayed in the image viewing area 110.

The image effects menu area 120 includes a number of items that allow the user to activate various image effect tools. In the illustrated example of FIG. 1, the image effects menu 120 includes only a grain effect tool activation button 105. However, the menu 120 also includes a number of other buttons for activating other image-editing tools such as hue control tool, gray scale control tool, etc. which are not shown in the figure. The grain effect button 105, when selected, activates the grain effect tool that allows the user to apply a dynamic grain effect to the image displayed in the image viewing area 110. A user can select button 105 e.g., by performing a gesture such as tapping the user's finger on the device's touchscreen over the button 105.

The four stages 101-104 of applying the grain effect to the image will now be described. The first stage 101 of FIG. 1 shows the GUI 100 of the image-editing application before activation of grain effect tool. As illustrated in this stage, thumbnail 160 has already been selected from the thumbnail display area 115. In some embodiments, selection of a thumbnail changes its appearance (e.g., becomes highlighted or changes color) in the thumbnail display area 115. The first stage 101 also shows that the user is selecting the grain effect button 105 to activate the dynamic grain effect tool (e.g., by tapping on the button 105).

The second stage 102 illustrates the GUI 100 after the grain effect tool is activated and a dynamic grain effect is applied to the image. The activation of the grain effect tool has caused two new sliders 130 and 140 appear in the GUI 100. The two sliders 130 and 140 are for applying different ISO values and grain amounts, respectively, to the image. As illustrated in stage 102, grain effect 125 is now added to the photo 170 (parallel straight lines representing the grains). In some embodiments, the grain ISO and the grain amount each has a preset default value. For instance, in the example of FIG. 1 the grain ISO slider is initially set to have an ISO value of 10 and the grain amount is initially set to have a grain amount of 0.5.

In the third stage 103, the user has started to change the grain ISO's value from 10 to a different value. The user is doing this by dragging the knob of the slider 130 toward right side of the slider in order to increase the ISO value. In some embodiments, the ISO values can only be set to certain values, similar to the fixed ISO values of traditional film (e.g., 10, 50, 400, and 3200). In other embodiments the ISO amounts can be set to any desired value in a range of values (e.g., any value between 10 and 3200). Changing the ISO value, in some embodiments, will result in changing the shape and pattern of the grain effect in the photo. As shown in stage 103, the parallel straight lines 125, which represent the grains, are replaced with parallel dashed lines 145, which represent a different type of grain, as the ISO value has increased from 10 to 40.

The fourth stage 104 shows that the user is increasing the grain amount from 0.5 to a higher value. As illustrated, the user is doing so by dragging the knob of the slider 140 towards the right side of the slider in order to change the grain amount. Changing the grain amount, in some embodiments, will result in changing the visibility of grains in the photo. As shown in stage 104, the number of parallel dashed lines 145 has significantly increased in this stage in comparison with the previous stage 103.

Figure 2:
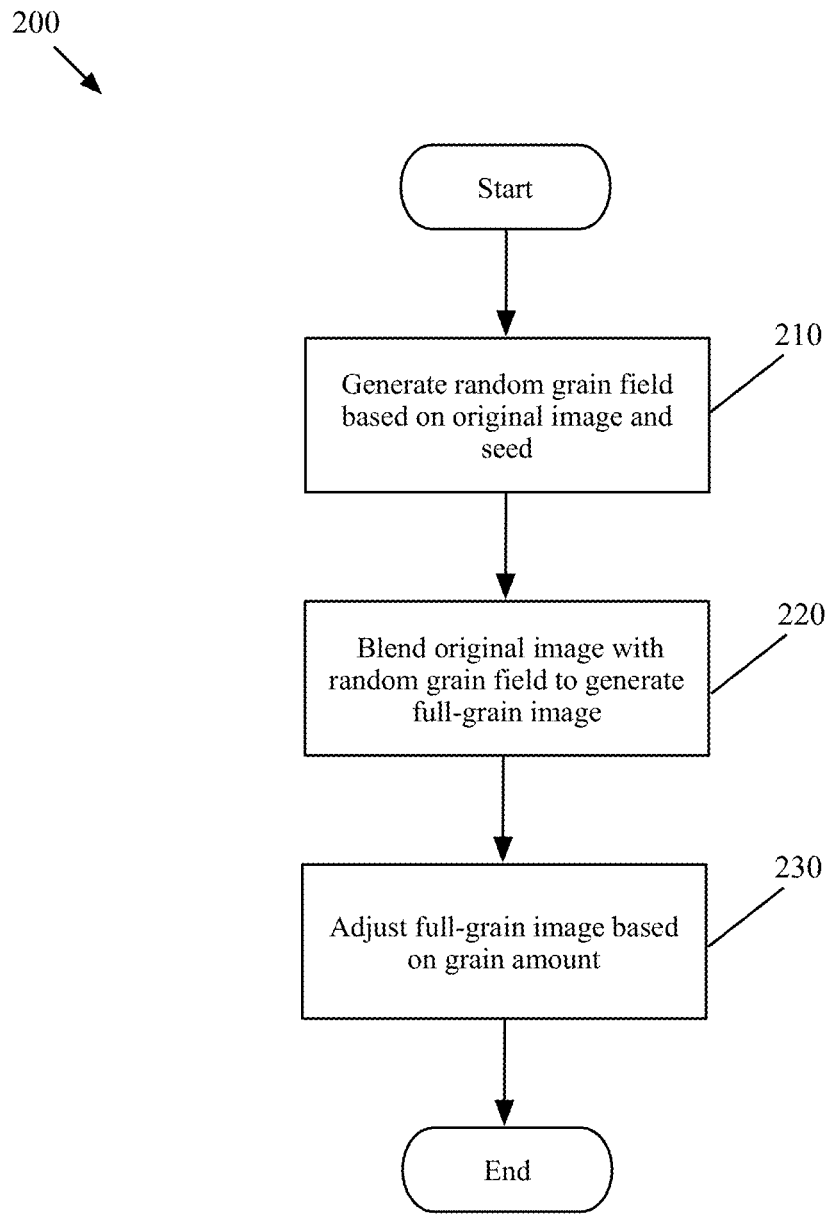
FIG. 2 conceptually illustrates a process that the image-editing application performs to generate a dynamic grain effect and apply the effect to a digital image.

FIG. 2 conceptually illustrates a process 200, of some embodiments, that the image-editing application performs to generate a dynamic grain effect and apply the effect to a digital image. Process 200 starts by generating (at 210) a random grain field based on a digital image (e.g., based on the dimensions of the original image) and an initial seed. The digital image in some embodiments is an image that the user of an image-editing application has selected to view and edit. The seed, on the other hand, is an initial variable that the application acquires to create a random pixel field. The process receives this initial variable from the user's computing device in some embodiments. The seed is produced in various ways by various embodiments. For example, some embodiments produce the seed based on a hash value generated from a file name of the image, some property of the image data, a time on the device's system clock, or any other process for providing a seed. Generation of a dynamic grain field will be discussed in more detail below in Section I by reference to FIGS. 5-6.

The process 200 next blends (at 220) the original image with the dynamic grain field in order to produce a full-grain image. Blending the original image with the dynamic grain field in some embodiments is adjusting the original digital image with the generated dynamic grain field. In some embodiments, the process determines each pixel's luminance in the image in order to generate an adjustment variable called a gamma adjustment value. In some such embodiments, the process 1) applies gamma adjustments to the pixels of the image; 2) modifies the gamma adjusted pixel values based on the value of corresponding pixels in the grain field; and 3) applies an inverse of the original gamma adjustments to the modified pixels, in order to create a full-grain image. Generation of a full-grain image will be discussed in more detail below in Section II by reference to FIG. 7.

Next, the process 200 adjusts (at 230) the full-grain image to generate the final and desired grainy image. The process, in some embodiments, adjusts the graininess of the image by determining a weighted average of the original image and the full-grain image based on a grain amount (e.g., a setting received from a user). Creation of the desired grainy image will be discussed in more detail below in Section II by reference to FIG. 8. The process 200 then ends.

Figure 3:
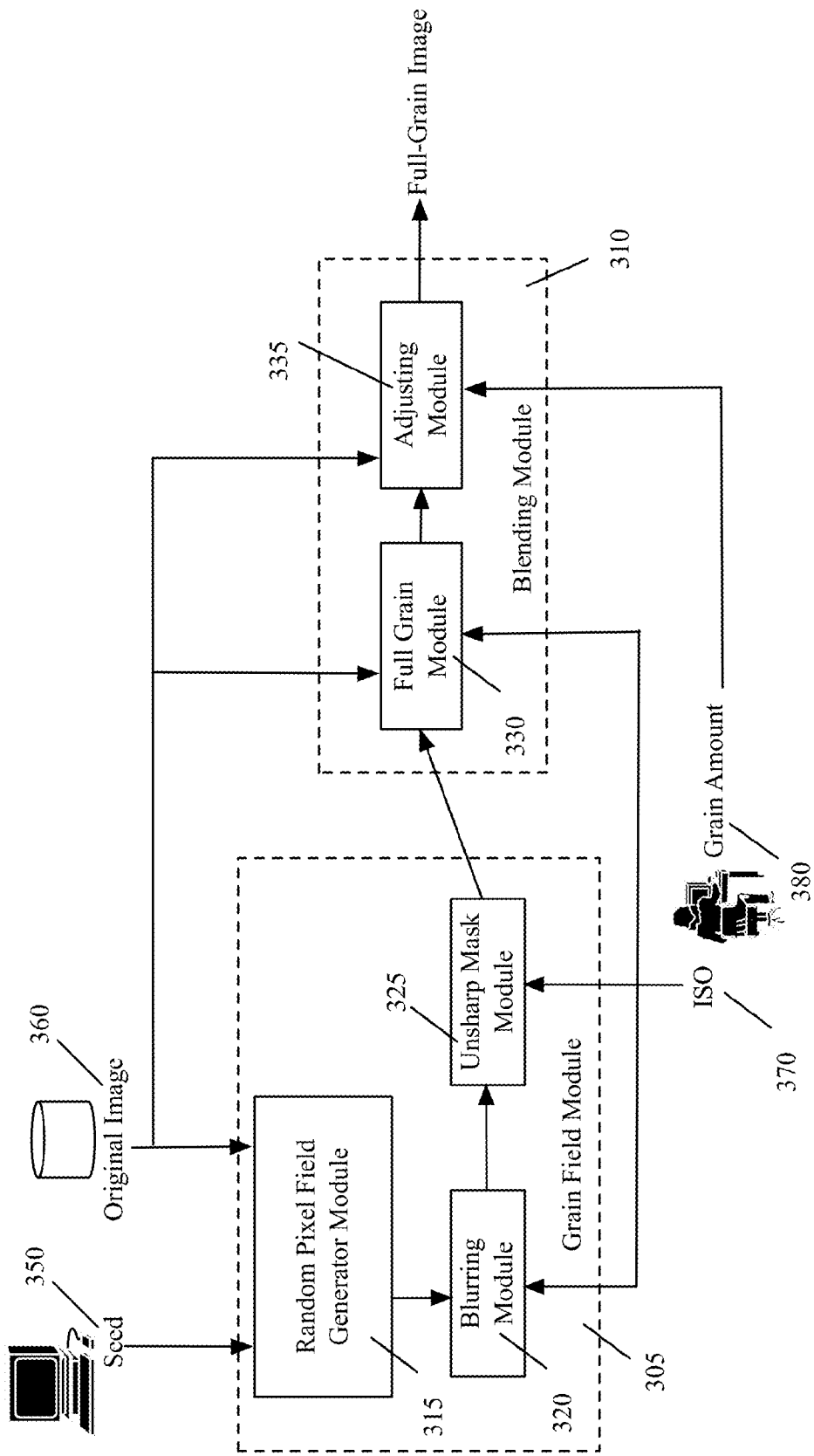
FIG. 3 illustrates the two modules that the grain effect tool of some embodiments employs in order to apply a dynamic grain effect to a digital image

The grain effect tool of the image-editing application, in some embodiments, includes two separate modules. FIG. 3 illustrates the two modules that the grain effect tool employs in order to apply a dynamic grain effect to a digital image in these embodiments. Specifically, this figure shows a grain field module 305 and a blending module 310 that the grain effect tool of some embodiments uses. The grain field module includes a random pixel field generator module 315, a blurring module 320, and an unsharp masking module 325. The Blending module 310 includes a full-grain module 330 and an adjusting module 335.

One of ordinary skill in the art would realize that each one of these modules can be combined with another module in some embodiments or each module can be divided into more sub-modules in other embodiments. Moreover, one of ordinary skill in the art would realize that the order and combination of the modules are not necessarily in the same order that is illustrated in the exemplary figure. For instance, in some embodiments, the adjusting module 335 is a separate module, which receives its input from the blending module 310. Each one of these modules will now be described by reference to exemplary FIG. 4 which shows the input and output of each module as the process of creating the desired grainy image progresses.

Grain field module 305 of FIG. 3 generates a dynamic grain field for each different image by receiving 1) a seed value 350 from a computing device on which the module runs, 2) an original image 360 from a data storage accessible to the image-editing application, and 3) an ISO value 370 from the user of the image-editing application. Although the above mentioned seed 350, image 360, and ISO 370 in the illustrated example are received from a computing device, a data storage, and a user, respectively, each one of these inputs can be received from different sources in different embodiments. For instance, the seed 350 in some embodiments can be generated by the image-editing application itself or it can be received from the user of the application. Similarly, the image 360 can be directly downloaded from a network (e.g. local network, internet, etc.) in some embodiments. The ISO 370 in some embodiments has a fixed default value and the image-editing application does not receive it from an external source.

Figure 4:
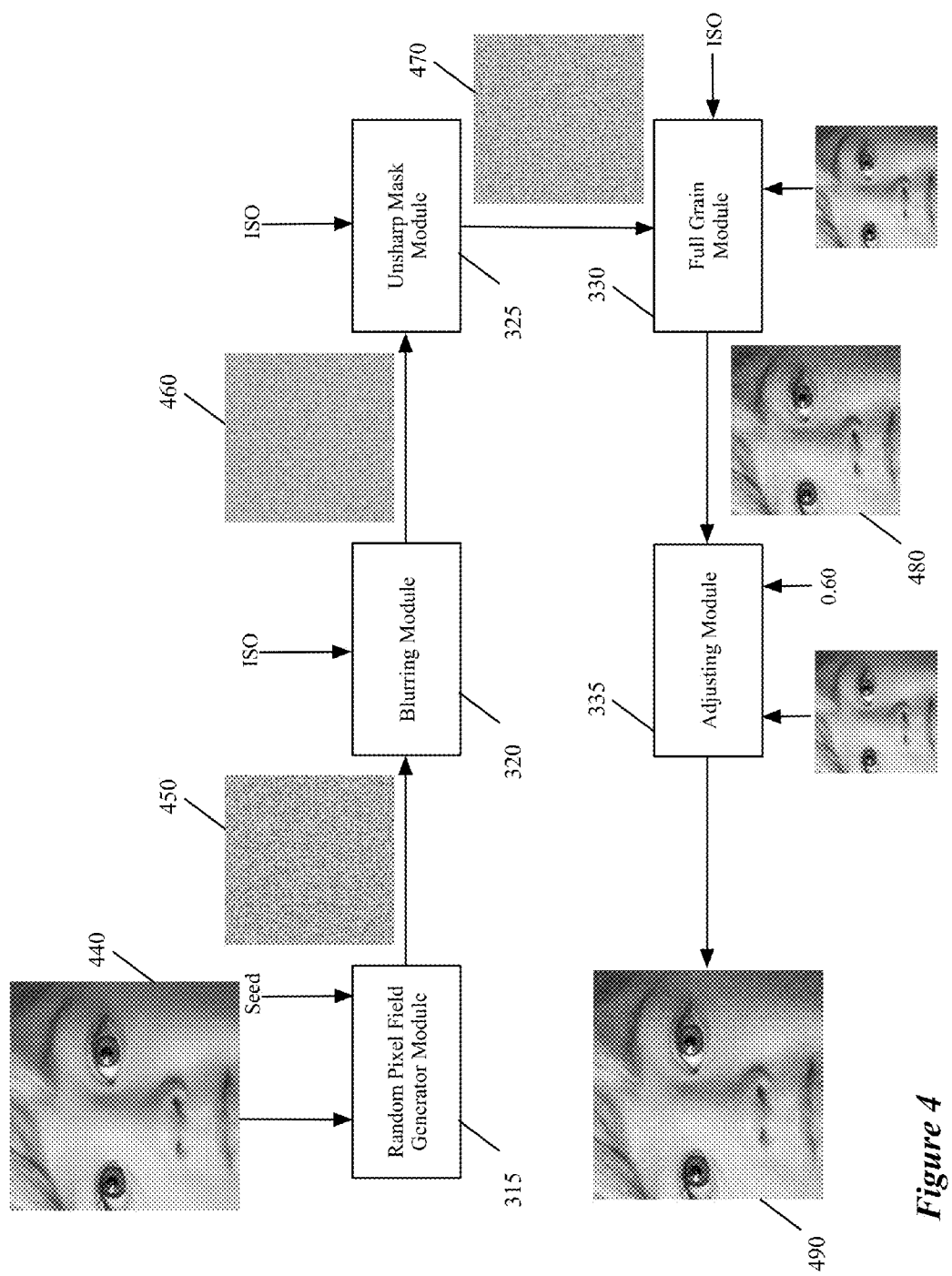
FIG. 4 illustrates the input and output of each module of FIG. 3 as the process of creating a desirable grainy image progresses.

As illustrated in FIG. 4, random pixel field generator module 315 first receives the image 440 and a seed value (i.e., an initial variable for this image) as its inputs. This module then generates a random pixel field 450 which will be used as an input for the blurring module 320. The image-editing application of some embodiments generates the random pixel field 450 based on the value of the seed and the locations of the pixels in the random pixel field. Although, the "pixels" in the random pixel field and dynamic grain field are not visually displayed, in some embodiments, the random pixel field and the grain field are divided into particular locations each of which has a particular value. In some such embodiments, the value of each particular location is computationally manipulated similarly to a pixel of an image that is visually displayed. Therefore, the individual value at a location is sometimes called a "pixel", herein.

The blurring module 320 receives the randomly generated pixel field and an ISO value. The ISO value is obtained from a user in some embodiments. In the example shown in FIG. 4, the ISO value is 400. The blurring module blurs the random pixel field 450 using a Gaussian function, the radius of which is determined based on the ISO value. The blurring module 320 of some embodiments uses the Gaussian blurring function to eliminate or reduce any potential noise and detail in the randomly generated pixel field 450. The output of the blurring module, as illustrated, is the blurred grain field 460.

The blurred grain field 460 is then used as an input for the unsharp masking module 325. Similar to blurring module 320, the unsharp masking module 325 uses the ISO value (e.g., 400 in the example shown) as its second input. The amount and radius settings of the unsharp masking function are also determined based on the ISO value. The unsharp masking module 325 of some embodiments increases the sharpness of the blurred grain field. The output of the unsharp masking module is the grain field 470. More details about blurring and unsharp masking functions are discussed in Section I, below, by reference to FIG. 6.

Returning to FIG. 3, after a dynamic grain field is generated by the grain field module 305, the blending module 310 receives the generated grain field and blends it with the original digital image in order to produce the desirable grainy image. The blending module 310 of some embodiments produces the desirable grainy image by receiving 1) the dynamic grain field from the grain field module 330, 2) a grain field amount 380 from the user of the image-editing application, and 3) an ISO value 370 also from the user of the image-editing application.

The full-grain module 330 in FIG. 4 receives the generated grain field 470 from the unsharp masking module as one of its inputs and the original digital image as the other input to produce the full-grain image 480. The full-grain module of some embodiments calculates a gamma adjustment value based on the luminance of each pixel in the original image and then applies the calculated gamma and the grain strength of corresponding coordinates in the grain field to produce the full-grain image 480.

Finally, the adjusting module 335 receives the output of the full-grain module (i.e., full-grain image 480) as its first input. The adjusting module 335 also receives a grain amount from a user as its second input and based on the grain amount, adjusts the grain pattern (i.e., graininess) in the full-grain image to create the desired grainy image 490. For adjusting the graininess of the image, the adjusting module of some embodiments determines a weighted average of the original image and the full-grain image with the weight based on the received grain amount.

A general view of an image-editing application of some embodiments that has a grain effect tool is presented above by describing different stages of FIG. 1. An overview of the process and modules that generate a dynamic grain field from a digital image and blend the grain field with the digital image are also described above by reference to FIGS. 2-4. More details of how the grain effect, in some embodiments, is generated and applied to the digital images are described in the following sections. Section I describes the generation of a random grain field. Section II then describes how the random grain field is blended with (i.e., used to adjust) the original image to produce the desired grainy image. Finally, Section III describes examples of electronic systems that implement some embodiments described herein.

I. Generating Dynamic Grain Field

In order to generate a dynamic grain field that is free of extra noise (e.g., streaks, bars, etc.), the application of some embodiments generates a random pixel field based on the dimensions of the original image and a seed value. The application of some embodiments obtains the seed value from a computing device on which the application runs. The application then generates a grain field for the image by consecutively applying a blurring function and an unsharp masking function to the randomly generated pixel field. The settings for the blurring and unsharp masking functions, in some embodiments, are calculated by interpolating values in a table based on a film speed variable (ISO). In some embodiments, a user sets the ISO variable. The application of some embodiments creates a dynamic grain field which has a different grain shape and pattern for each different image by 1) generating a random pixel field based on a seed value and 2) applying the blurring and unsharp masking functions to the random pixel field based on different ISO values.

A. Generating Random Pixel Field

The first step in generating a dynamic grain field is to generate a random pixel field. The initial random pixel field generation method determines the random appearance of the resulting grain. In other words, the grain effect tool of some embodiments is able to produce different grain effects for different images by using this random pixel field, instead of using a single static grain pattern, to generate the grain field pattern. In some embodiments the random pixel field and the dynamic grain field are created solely for the purpose of generation of grain pattern in the original digital image and they are not necessarily visible to the user of the image-editing application.

Figure 5:
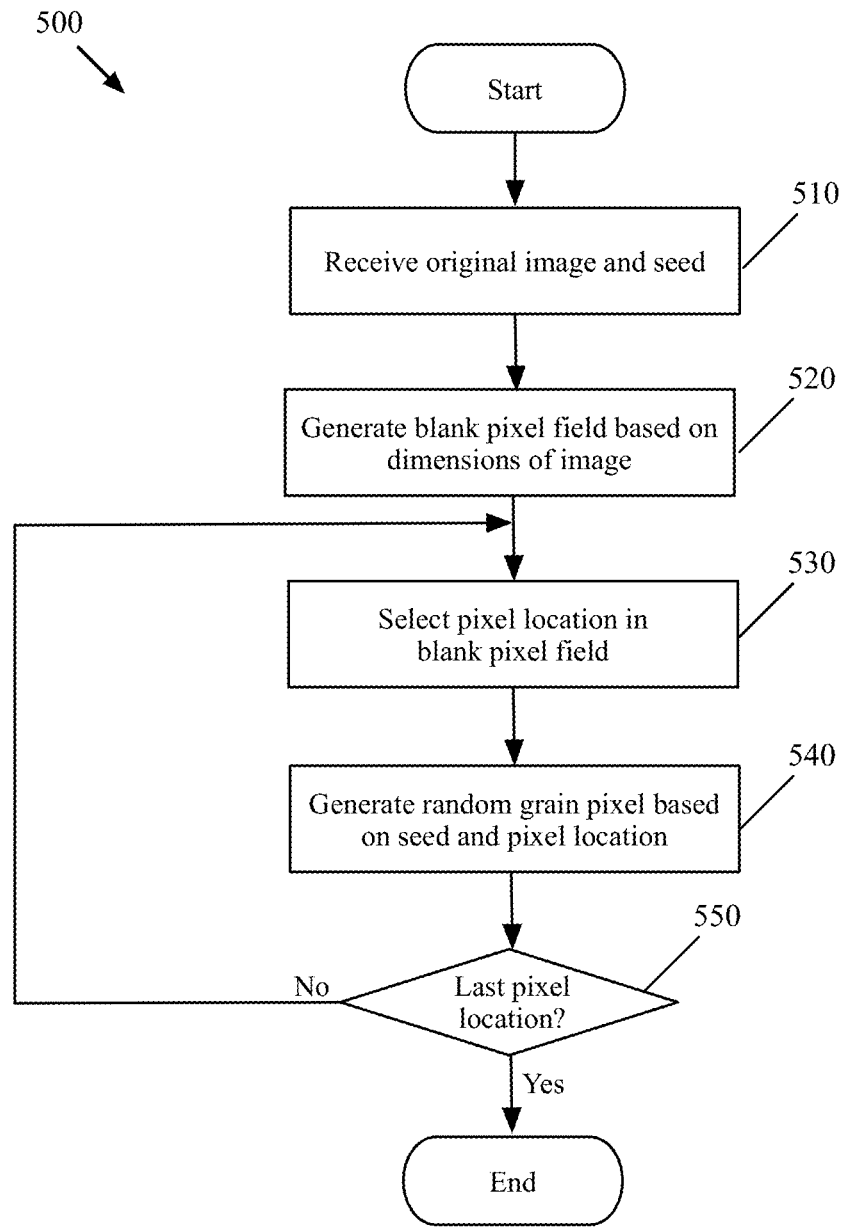
FIG. 5 conceptually illustrates a process of some embodiments, that the image-editing application performs to generate a random pixel field.

FIG. 5 conceptually illustrates a process 500, of some embodiments, that the image-editing application performs to generate a random pixel field. The media-editing application of some embodiments performs most of its processes such as the process 500 on the graphic processing unit (GPU) of the user's computing device. Running the process on the device's GPU results in a faster and more efficient generation and application of the dynamic grain effect. In some other embodiments, the application performs all of its processes including the process 500 on the central processing unit (CPU) of the device. In yet some other embodiments the application performs some of its processes on the CPU and some other processes on the GPU of the device based on a combination of different factors (e.g., operating system requirements, size of the process, etc.).

The process 500 starts by receiving (at 510) a digital image and a seed. The digital image in some embodiments is an image that the user of an image-editing application has selected to view and edit. This image can be retrieved from an archive (e.g., a photo album) that is stored in a memory storage or it can be received from a user while the user takes photos or videos with a camera of the device performing the process 500. One of ordinary skill in the art would realize that there are many other methods for receiving or downloading an image. For example, a photo can be downloaded from a local network or a wide area network such as the Internet. Moreover, although the grain effect tool described herein is more practical and most pleasing if used for a black and white photo, one of ordinary skill in the art would realize that the same methods and processes described herein can be used to generate and apply dynamic grain effect to color images.

The source of the seed that the process 500 receives can be different in different embodiments. For instance, the media-editing application of some embodiments receives the seed from the user's computing device (i.e., the computing device on which the media-editing application is running) In some embodiments the seed is a hash value generated from a file name in the device's memory (e.g., the file name of the digital image) or based on some property of the digital image (e.g., a hash value of the image). In some other embodiments the seed is generated based on the device's system clock. In yet some other embodiments, the seed is acquired from a source other than the user's device.

The process 500 then generates (at 520) a blank pixel field based on the dimensions of the image that the process has received. In some embodiments the dimensions of the image are used to determine the dimensions of the random pixel field that the process creates. Although the process of some embodiments only uses the image for its size and dimensions, the process in some other embodiments, produces the random pixel field based on the size of the image and the value of each pixel in the image.

Next, the process 500 selects (at 530) a pixel location in the blank pixel field. As mentioned before, the pixels in the random pixel field and dynamic grain field of some embodiments are not visually displayed. However, because of the similarities of a visually displayed pixel and a value for a location in the random pixel field and the grain field of these embodiments, the term "pixel" is used herein to refer to a value at a particular location of the random pixel field or grain field.

The process 500 then generates (at 540) a random grain pixel based on the location and the seed value. The process 500 of some embodiments uses a linear-congruence pseudo-random number generator that receives the location and the seed in order to generate each grain pixel in the random pixel field. The process 500 then determines (at 550) whether the selected location was the last location in the random pixel field. If the selected location is not the last location, the process returns to 530 to select the next location in the random pixel field. On the other hand, if the selected location is the last location in the pixel field the process 500 ends.

B. Apply Blurring and Unsharp Masking

After a random pixel field is generated, the image-editing application of some embodiments applies a blurring function and an unsharp masking function consecutively to the random pixel field in order to generate the final dynamic grain field.

Figure 6:
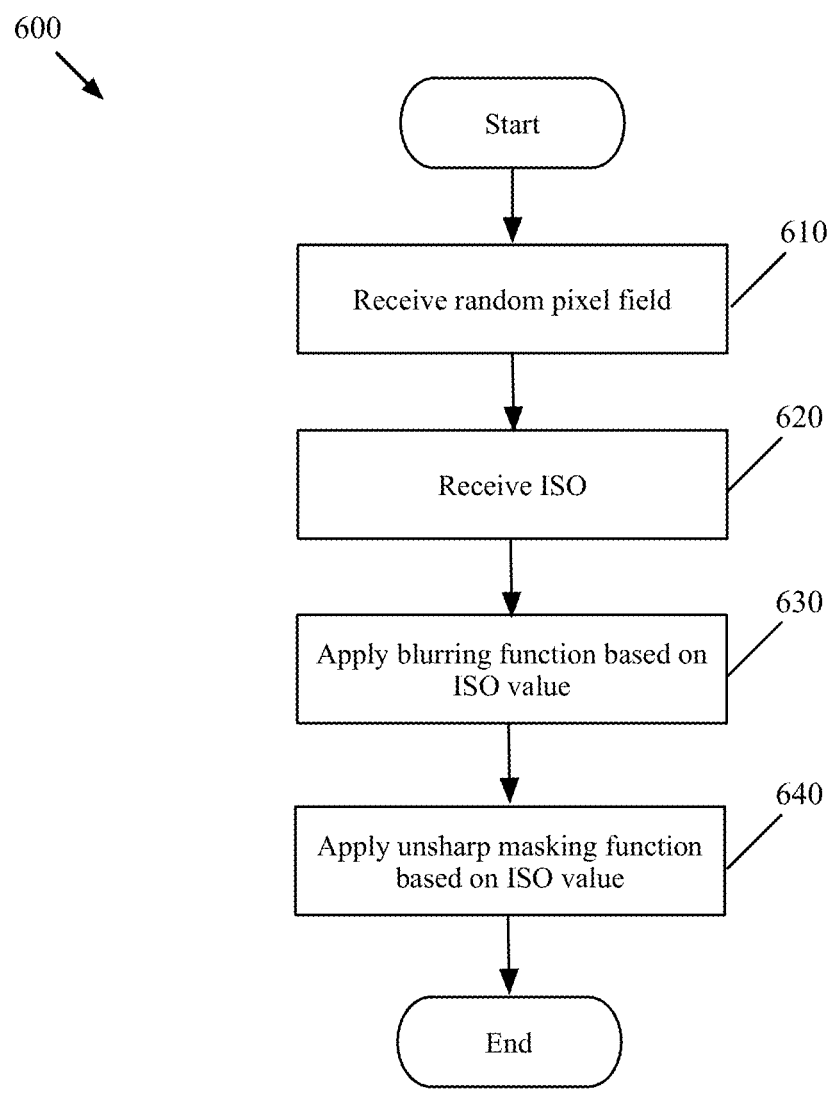
FIG. 6 conceptually illustrates a process that the image-editing application of some embodiments performs to produce the dynamic grain field.

For some embodiments, FIG. 6 conceptually illustrates a process 600 that the image-editing application of some embodiments performs to produce the dynamic grain field. The process 600 receives (at 610) the random pixel field that was previously generated (e.g., by the process 500 described above). The process 600 also receives (at 620) an ISO value. In some embodiments, a user has the option to select an ISO value from a fixed number of predetermined values that are similar to traditional film speed values (e.g., 10, 50, 400, and 3200). Additionally, similar to traditional photography, in which, the higher the value of the ISO is, the larger the grains are, in some embodiments the shape and the pattern of the grains change as the ISO changes from one value to another. In some embodiments, the ISO values can only be set to certain values by a user, similar to the fixed ISO values of traditional film (e.g., 10, 50, 400, and 3200). In some other embodiments, the ISO amounts can be set to any desired value in a range of values (e.g., any value between 10 and 3200) by a user. In yet some other embodiments the ISO value is set to a fixed default value and cannot be changed by a user.

The process 600 then applies (at 630) a blurring function to the random pixel field based on the ISO value. The blurring function of some embodiments blurs the random pixel field using a Gaussian function, the radius of which is determined based on the ISO value that is received from the user (e.g., by interpolation from a table of ISO values and their associated blur radii). The application of some embodiments applies the Gaussian blurring function to the random pixel field to eliminate any potential remaining noise and detail in the randomly generated pixel field.

The process 600 then applies (at 640) an unsharp masking function to the blurred random pixel field. The amount and radius settings of the unsharp masking function are also determined based on the ISO value (e.g., by interpolation from a table of ISO values and their associated unsharp mask radii and unsharp mask amounts). The unsharp masking function of some embodiments increases the sharpness of the blurred grain field. In some such embodiments, sharpening the image, in fact, increases the contrast along the edges where different colors meet (e.g., white, gray, and black).

II. Blending Original Image with Grain Pattern

The application of some embodiments after generation of the grain field, blends the original image with the dynamic grain field by adjusting the original image based on the resulting grain field and a gamma adjustment variable in order to generate a full-grain image. Although the term "blend" is used to describe the adjustment of the original image based on the grain field, in some embodiments, "blending" is not an averaging of the two sets of values, but is a mathematical adjustment as described below.

A. Generating Full-Grain Image

In some embodiments, the application generates the full-grain image by applying a particular adjustment variable (e.g., a gamma adjustment) to the pixels of the image. In some embodiments, different gamma values are used for different pixels. The gamma value applied to a pixel, in some embodiments, is calculated based on the luminance value of the pixel in the original image. The application of some embodiments then modifies the gamma adjusted pixel value based on the value of a corresponding pixel in the grain field. The application then applies an inverse of the original gamma adjustment to the modified pixel. Applying the gamma adjustment, modification by the grain field, and inverse gamma adjustment to the image results in the appearance of a grain pattern in the full-grain image. The grain pattern produced by such an application is very similar to the grain pattern of traditional photography.

Figure 7:
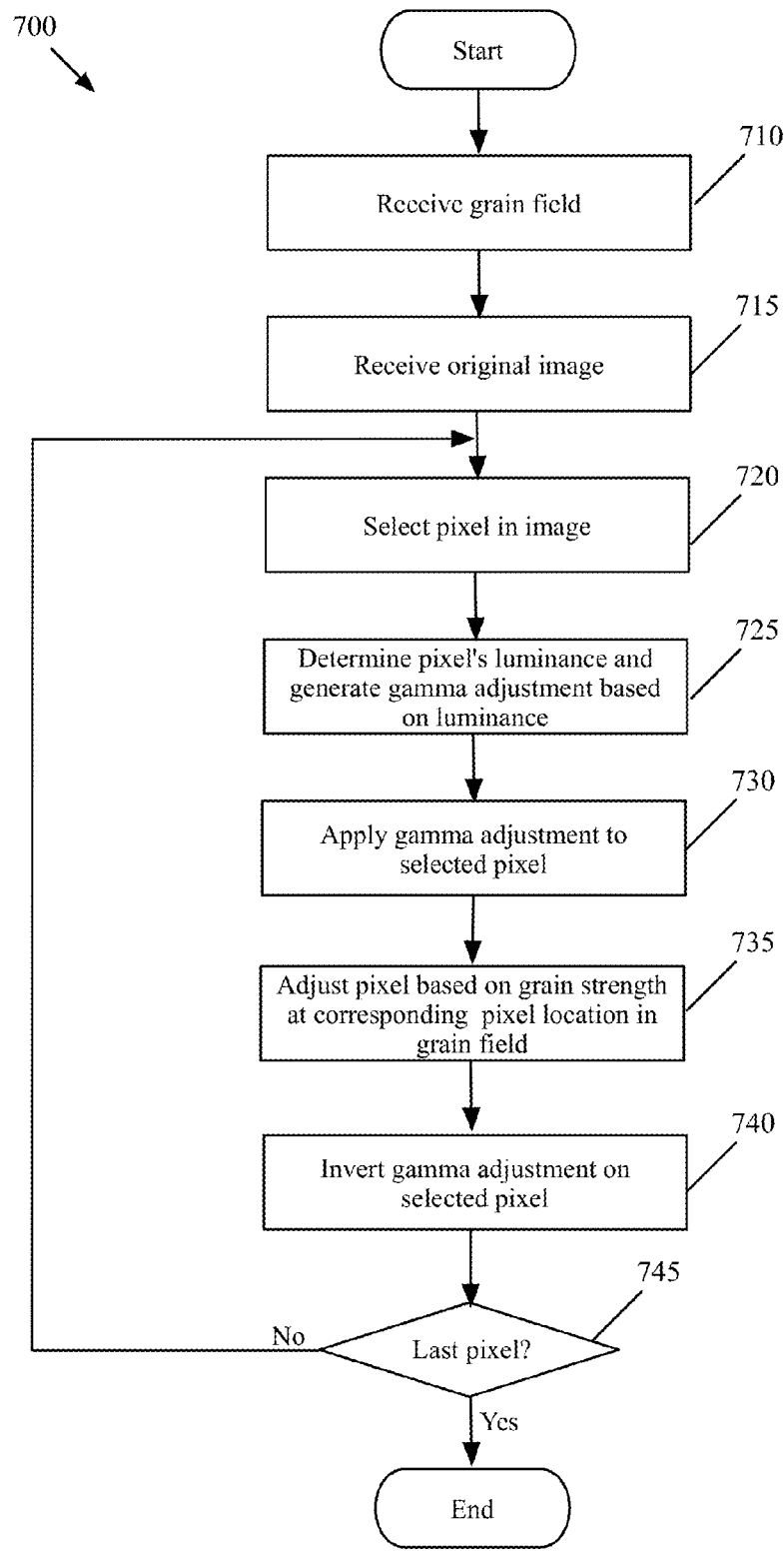
FIG. 7 conceptually illustrates a process of some embodiments that the image-editing application performs to blend the grain field with the original image in order to produce a full-grain image.

FIG. 7 conceptually illustrates a process 700, of some embodiments, that the image-editing application performs to blend the grain field with the original image in order to produce a full-grain image. The process 700 starts by receiving (at 710) the dynamic grain field that was previously generated. The pixel locations in the grain field, as will be described in more detail below, are used to adjust the pixels of the original image. The process 700 then receives (at 715) the original digital image. The process 700 of some embodiments uses the pixels' luminance values in the original image in order to calculate a gamma adjustment variable for each pixel.

The process then selects a pixel (at 720) from the image. Next, the process 700 determines (at 725) the pixel's luminance and generates the adjustment variable gamma based on the luminance of the pixel. Determining the gamma from the luminance of the pixels in some embodiments will guaranty the generation of appropriate grain when the pixels are all white or all black. In other words the variable gamma dictates how much the grain is visible for a given whiteness amount. In some embodiments, each pixel's luminance (e.g., brightness) represents a level of different shade of gray. The luminance value in these embodiments ranges on a luminance scale from 0 to 1 (e.g., 0 being fully black and 1 being fully white).

In some embodiments the gamma adjustment value is determined based on the following equations:

$$\text{lum}=(R+G+B)/3 \tag{1}$$

$$\text{gamma}=4.01-2*\text{lum} \tag{2}$$

In equation (1), R, G, and B represent the red, green, and blue component values of the pixel, respectively, in an RGB color space. Therefore, the "lum" represents an average brightness of the pixel component values. The gamma adjustment value is then calculated in equation (2) based on the variable "lum" (the luminance (brightness) of the pixel). One of ordinary skill in the art would realize that although the color component values of the pixel in equation (1) belong to an RGB color space, the color component values of other color spaces can replace these components to determine the luminance of the pixel. Alternatively, one of ordinary skill in the art would also realize that other color spaces (e.g., Y'CbCr color space, etc.) can be converted to RGB color space before calculation of variable "lum" in equation (1).

The process 700 next applies the gamma adjustment (at 730) to the selected pixel. The application of gamma adjustment to each pixel causes the grain to appear in the right ratio in terms of lightening the dark pixels and darkening the light pixels. Essentially, the white pixels have no grain (no grain is visible in the light) and the dark pixels represent the areas of the image that are fully exposed thus no visible grain in those areas of the image either. The gamma adjustment to the pixels causes sparser appearance of grain patterns as the luminance values of the pixels approach the extremes in the luminance scale (i.e., the pixel's luminance value gets closer to 0 (completely black) or 1 (completely white)) and more concentrated appearance of grains as the luminance values of the pixels are in the middle ranges of the luminance scale.

In some embodiments the process 700 applies the gamma adjustment to a pixel based on the following equation:

$$pixel_{adj} = pixel\char`^1/gamma \quad (3)$$

In the above equation (3) $pixel_{adj}$ represents the adjusted pixel and equals the value of the pixel to the power of one over the value of gamma.

The process 700 then modifies (at 735) the adjusted pixel based on the grain strength of the corresponding location in the grain field. The modification of the adjusted pixel in some embodiments is determined based on the following equations:

$$mult = contrast*grain \quad (4)$$

$$pixel_{mod} = pixel_{adj} + max(pixel_{adj}, 0.5)*mult \quad (5)$$

In equation (4), above, the variable "mult" is calculated by multiplication of two other variables "contrast" and "grain". The variable "contrast" represents the grain contrast of each pixel and is calculated based on the value of the ISO (e.g., by interpolation from a table of ISO values and their associated grain contract values). The variable "grain" represents the value of the corresponding pixel in the grain field. The "max" function selects the larger of the adjusted pixel value and 0.5. Thus, in equation (5) the variable mult is multiplied by the value of the gamma adjusted pixel if this value is greater than 0.5 or else, the variable mult is multiplied by 0.5. The result of this multiplication in equation (5) then is added to the value of the gamma adjusted pixel to calculate the value of the modified pixel (i.e., $pixel_{mod}$) that now is modified by the grain strength of the corresponding location in the grain field.

The process 700 then inverts (at 740) the gamma adjustment that it had previously applied on the pixel. In some embodiments, before inverting the gamma adjustment, the process takes a weighted average of the gamma-adjusted pixel and the grain-adjusted pixel, the weight based on the original luminance value of the pixel and assigns this new value to the pixel. The process of some embodiments then inverts the gamma adjustment in order to assign a value to the pixel that is close to what it was before the gamma adjustment was applied. This ultimately causes the full-grain image to look like original image only with added grains rather than looking like a gamma adjusted version of the original image.

The weighted average of the pixels in the image and the inversion of gamma adjustment for each pixel are determined, in some embodiments, based on the following equations:

$$pixel_{ave} = (pixel_{mod}*lum) + (1-lum)*pixel_{adj} \quad (6)$$

$$pixel_{fin} = pixel_{ave}\char`^gamma \quad (7)$$

In equation (6), the $pixel_{ave}$ represents a weighted average between the modified pixel ($pixel_{mod}$), that was previously modified by the grain value of the corresponding location in the grain field, and the adjusted pixel, after the gamma adjustment, but before any other adjustments and/or modification. The weight is based on value of the variable "lum" (the luminance value of the original pixel). In equation (7) the process applies an inverse of the original gamma adjustment to the $pixel_{ave}$ (the weighted average value of the gamma adjusted pixel and the modified pixel) by assigning to the pixel ($pixel_{fin}$) the value of the $pixel_{ave}$ to the power of the previously calculated gamma for that pixel.

The process 700 then determines (at 745) whether the selected pixel was the last pixel in the image. If the selected pixel is not the last pixel of the image, the process returns to 720 to select the next pixel in the image and apply the same gamma-adjustment and grain-adjustment to the next pixel. On the other hand, if the selected pixel is the last pixel of the image, the process 700 ends.

While some embodiments described herein use a luminance scale from 0 to 1, one of ordinary skill in the art will understand that other luminance scales are used in other embodiments. For example, some embodiments use a luminance scale from 0 to 255.

B. Adjusting the Graininess

The application of some embodiments applies a grain amount, which can be received from the user, to the previously generated full-grain image in order to adjust the graininess (i.e., grain's strength) of the image. For adjusting the graininess of the image, the application of some embodiments determines a weighted average of the original image and the full-grain image, the weight based on the received grain amount in order to render the desired grainy image.

Figure 8:
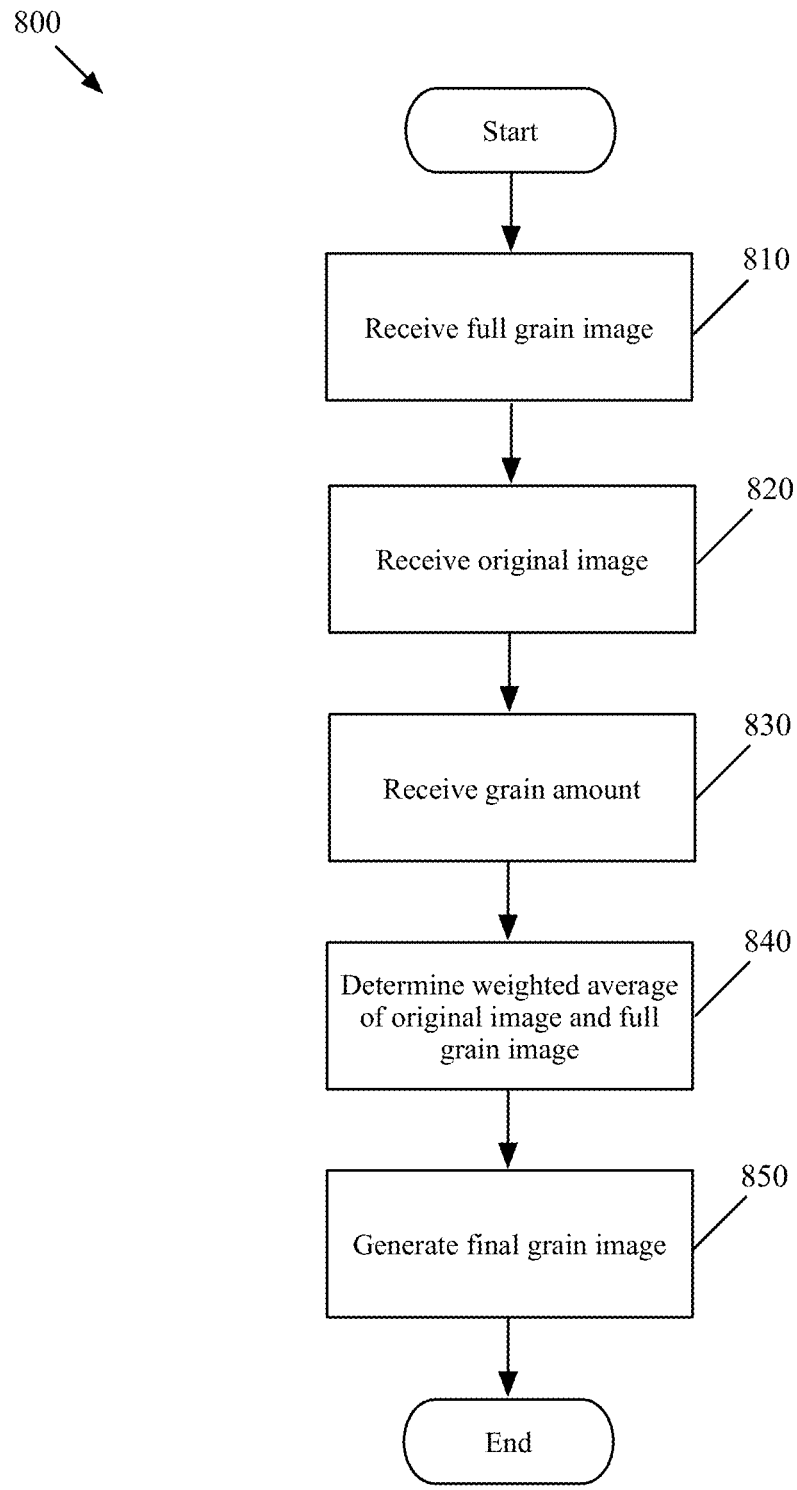
FIG. 8 conceptually illustrates a process that the image-editing application performs to adjust the graininess of a full-grain image.

FIG. 8 conceptually illustrates a process 800, of some embodiments, that the image-editing application performs to adjust the graininess of a full-grain image. The process 800 starts by receiving (at 810) the full-grain image that was previously generated by process 700 of FIG. 7. The process also receives (at 820) the original digital image and a grain amount (at 830). The grain amount in some embodiments varies between two fixed values of 0 and 1 and can be received by the image-editing application from a user of the grain effect tool. The grain amount determines the extent or ratio (e.g., visibility) of the grains in the final grainy image. The higher the grain amount value is (i.e., the closer the value is to 1), the more the grains will be visible in the final grainy image. Conversely, the lower the grain amount is (i.e., the closer the value is to 0), the less the grains will be visible in the final grainy image.

Figure 9:
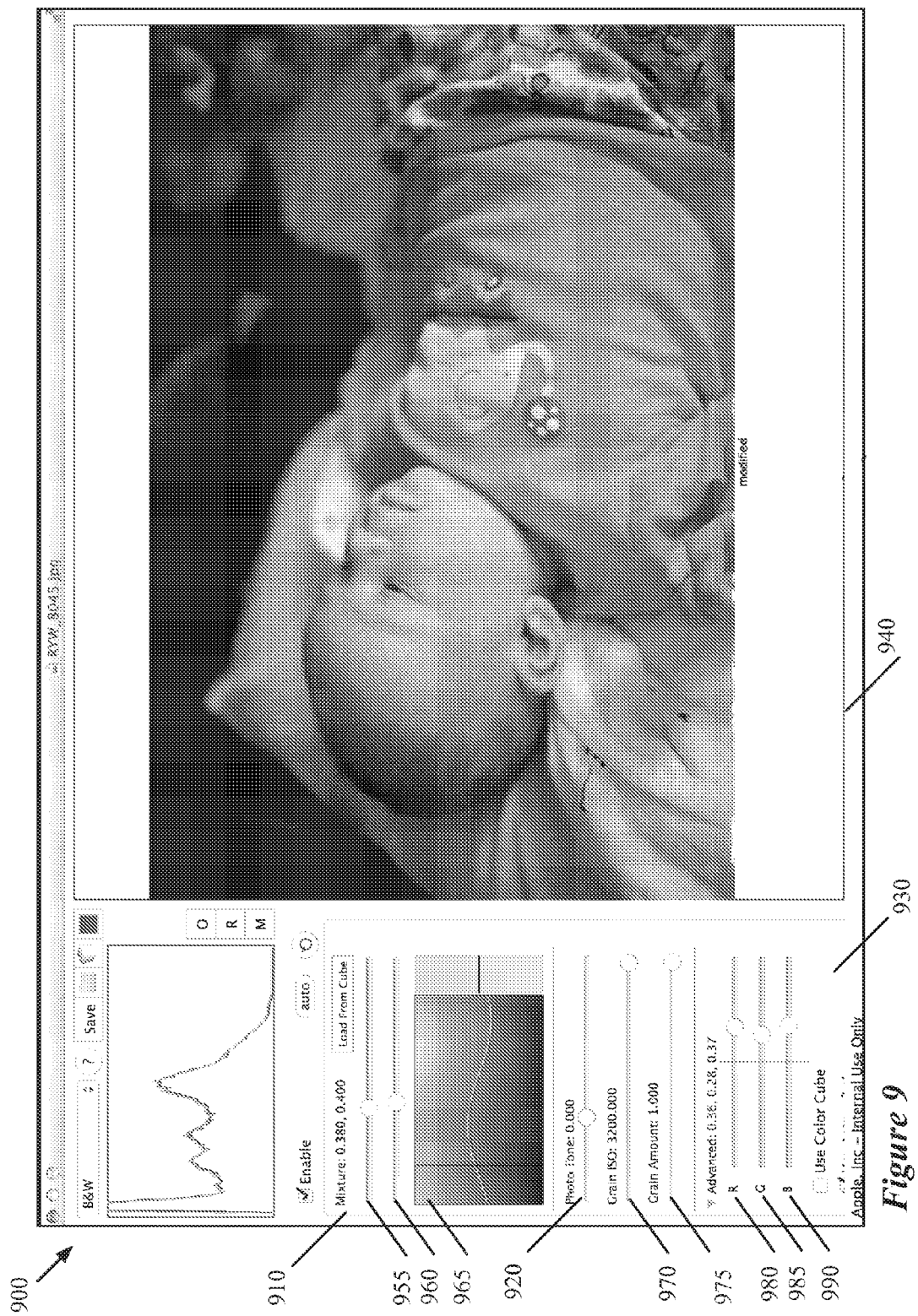
FIG. 9 illustrates a general view of an image-editing application of some embodiments.

The process 800 then determines (at 840) a weighted average of the original image and the full-grain image. The weight of the weighted average is based on the received grain amount. The process 800 then generates (at 850) a final grain image. For some embodiments, FIG. 9 illustrates a general view of an image-editing application. Specifically, the figure illustrates the GUI 900 of an image-editing application with dynamic grain effect tool as well as several additional tools with features different than the features described above. The GUI 900 includes a hue control tool 910, a dynamic grain effect tool 920, a gray scale control tool 930, and an image viewing area 940.

The hue control tool 910 includes a phase slider control 955, a strength slider control 960, and a hue curve 965. In some embodiments the shape of the hue curve 965 determines how much of a modification to apply, in the grayscale image, to the different hue values across the range of hue color values. In some embodiments, the user may adjust the sliders 955-960 within the hue control 910 in order to modify the hue curve 965 (phase and/or strength). Based on the final shape of the hue curve 965, the application computes a gamma value for each pixel in the grayscale image to apply to the pixel. In some embodiments, the image-editing application computes a gamma value to be applied to each pixel in the initial black and white image based on the shape of the hue curve 965 and the particular hue value of the pixel. The shape of the hue curve 965 may be modified, in some embodiments, by using sliders 955-960 or by directly adjusting the hue curve 965. U.S. patent application Ser. No. 14/058,093, entitled "Interactive Black and White Image Editing," now published as U.S. Patent Publication 2015/0109323, filed concurrently with this application, describes the hue control tool of some embodiments in more detail. This application is incorporated herein by reference.

The dynamic grain effect tool 920 of some embodiments includes a grain ISO slider 970, and a grain amount slider 975. As described above, the grain ISO slider 970 of some embodiments is for receiving an ISO value from a user and use this value in applying the blurring and unsharp masking functions to the random pixel field in order to generate a dynamic grain field. The ISO value in some embodiments is also used in generation of the full-grain image. Also, as previously described, the grain amount slider 975 of some embodiments is for receiving a grain amount from a user which is used to adjust the full-grain image into a desirable grainy image.

The gray scale control tool 930 of some embodiments includes three separate sliders 980-990 for R, G, and B values of a corresponding color image respectively. Each of these sliders separately determines how much influence its corresponding color component of the color image will have on the grayscale image. In some embodiments of the image-editing applications, one or more weighting values can be set to either a positive or a negative value. In such embodiments, when a weight is set to be in a positive range (e.g., 50%), the higher the corresponding component value (r, g, or b) of a pixel is, the more it adds to the luminance of the corresponding grayscale pixel. Conversely, for a component with a weight set to be in a negative range (e.g., −30%), the higher the corresponding component value of a pixel is, the more it subtracts from the luminance of the corresponding grayscale pixel. U.S. patent application Ser. No. 14/058,093, entitled "Interactive Black and White Image Editing," filed concurrently with this application, describes the hue control tool of some embodiments in more detail.

And finally, the image viewing area 940 of some embodiments is for viewing and editing of an image that is retrieved by the image-editing application. In some embodiments, the image-editing application displays an image in its original form inside the image viewing area 940 when the image is loaded from a storage medium into the application. Once a particular effect has been applied to the image, the user can view the resulting image in the image viewing area 940.

III. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves, transitory signals, and electronic signals passing wirelessly or over wired connections.

In this specification, the term "software" is meant to include firmware residing in read-only memory or applications stored in magnetic storage, which can be read into memory for processing by a processor. In addition, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 10:
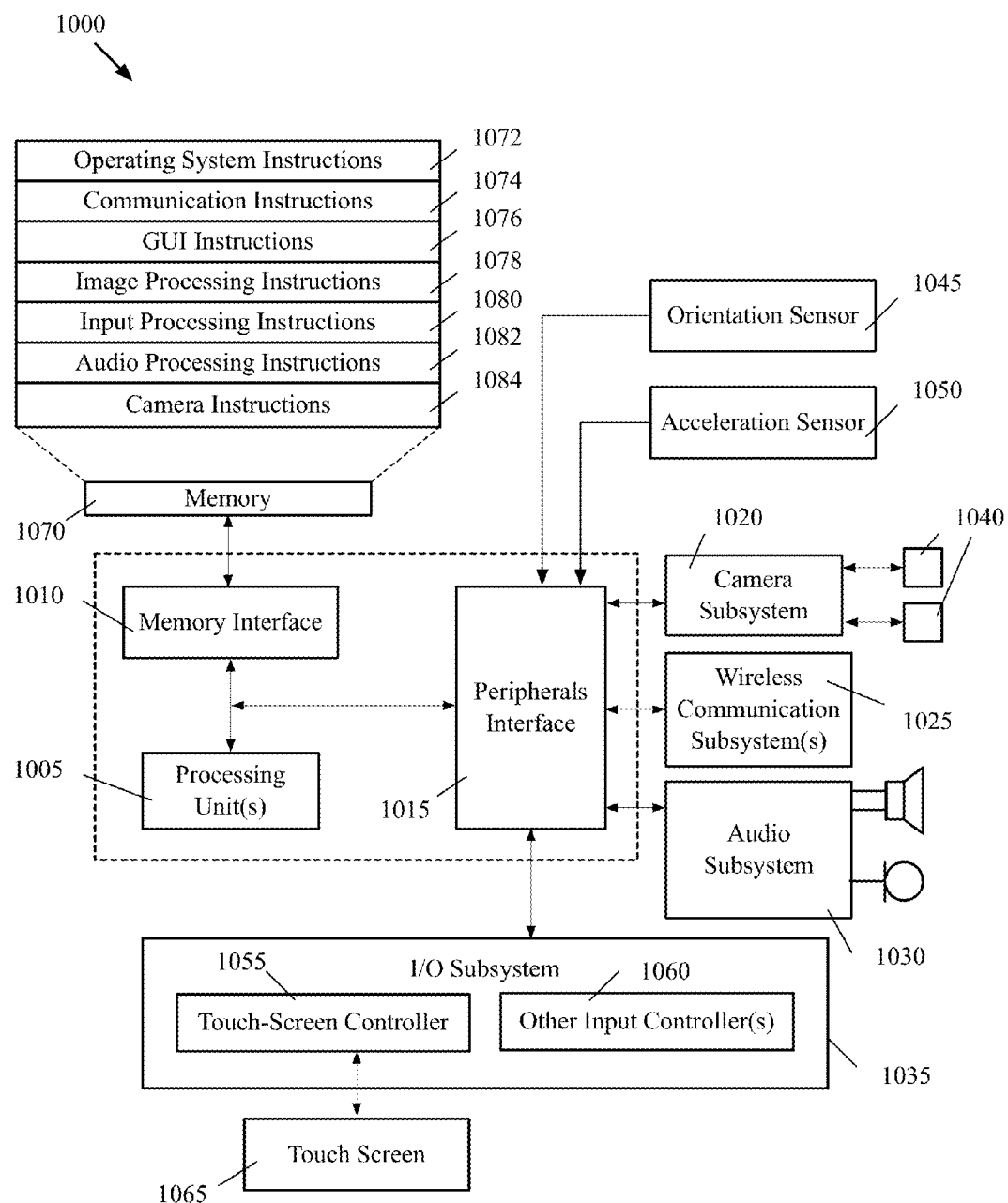
FIG. 10 is an example of an architecture of a mobile computing device on which the dynamic grain effect tool of the image-editing application of some embodiments operates.

The dynamic grain effect tool of the image-editing application of some embodiments operates on mobile devices. FIG. 10 is an example of an architecture 1000 of such a mobile computing device. Examples of mobile computing devices include smartphones, tablets, laptops, etc. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD) optical sensor, a complementary metal-oxide-semiconductor (CMOS) optical sensor, etc.). The camera subsystem 1020 coupled with the optical sensors 1040 facilitates camera functions, such as image and/or video data capturing. The wireless communication subsystem 1025 serves to facilitate communication functions. In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output different sound effects associated with different image operations). Additionally, the audio subsystem 1030 is coupled to a microphone to facilitate voice-enabled functions, such as voice recognition, digital recording, etc.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen 1065 using any of multiple touch sensitivity technologies. The other input controllers 1060 are coupled to other input/control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1072. The OS 1072 includes instructions for handling basic system services and for performing hardware dependent tasks.

The memory 1070 also includes communication instructions 1074 to facilitate communicating with one or more additional devices; graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

B. Computer System

Figure 11:
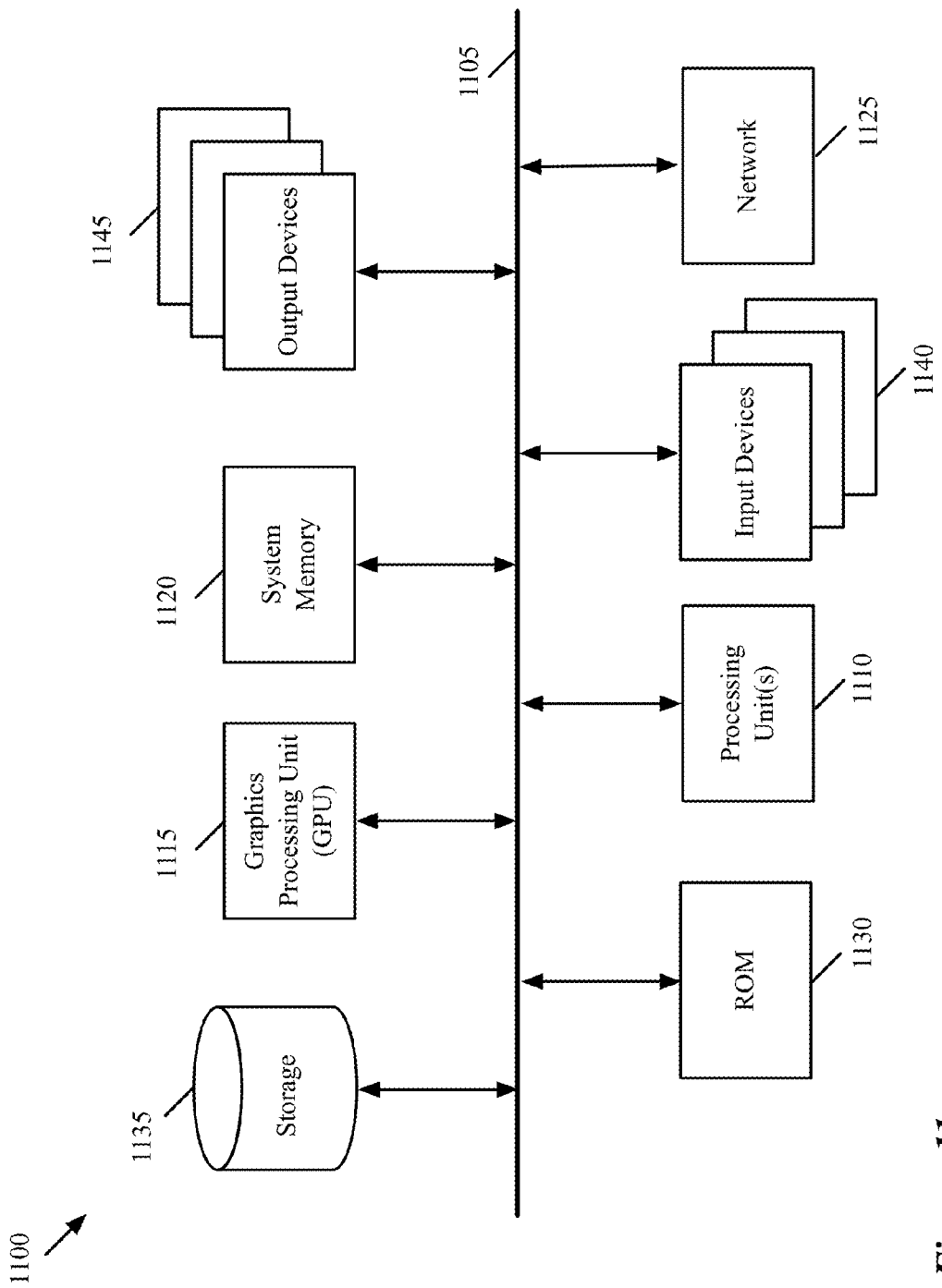
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "non-transitory computer readable medium" "computer readable media," "non-transitory readable media", "machine readable medium", and "non-transitory machine readable medium" are entirely restricted to tangible, physical objects that store information in a form that is readable by a computers. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (e.g., FIGS. 2 and 5-8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In addition, controls for setting the single adjustment value used to perform different image-editing operations are shown as slider controls in FIG. 1. The sliders of such embodiments provide a visual indication of a setting value as a knob is slid along the slider to set a value for the slider. However, in some embodiments, the slider controls shown in any of those figures could be replaced with any other control capable of receiving a value (e.g., a single value), such as a vertical slider control, a pull down menu, a value entry box, an incremental tool activated by keyboard keys, other range related UI controls (e.g., dials, buttons, number fields, and the like), etc. Similarly, the slider controls of those figures are either depicted as being set with a finger gesture (e.g., placing, pointing, tapping one or more fingers) on a touch sensitive screen or simply shown in a position without any indication of how they were moved into position. One of ordinary skill in the art will understand that the controls of FIG. 1 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A non-transitory machine readable medium storing a program that when executed by at least one processing unit of a computing device generates a grainy image, the program comprising sets of instructions for:
   receiving a digital image stored on the computing device;
   displaying the digital image in an image viewing area;
   receiving input of a value from a user that represents an ISO variable based on a film speed;
   generating a pixel field based on dimensions of the received digital image and a seed value generated by the computing device;
   generating a dynamic grain field by iterating through each of a plurality of pixels of the generated pixel field to blur and unsharpen the pixels according to the received ISO variable;
   blending the dynamic grain field with the digital image stored on the computing device in order to generate a full-grain image;
   adjusting the full-grain image based on a grain amount value to generate the grainy image; and
   displaying the generated grainy image in the image viewing area.

2. The non-transitory machine readable medium of claim 1, wherein the set of instructions for generating the dynamic grain field comprises sets of instructions for:
   applying a blurring function to the generated pixel field; and
   applying an unsharp masking function to the blurred pixel field.

3. The non-transitory machine readable medium of claim 2, wherein settings for the blurring and unsharp masking functions are looked up in an interpolation table based on the received value that represents the ISO variable.

4. The non-transitory machine readable medium of claim 1, wherein the set of instructions for blending the dynamic grain field with the digital image in order to generate the full-grain image comprises sets of instructions for:
   determining a gamma adjustment value for each pixel in a plurality of pixels of the digital image;

applying a gamma adjustment to a value of each pixel of the plurality of pixels of the digital image based on the gamma adjustment value;

adjusting the value of each pixel of the plurality of pixels of the digital image based on a grain amount of a corresponding location in the dynamic grain field; and inverting the gamma adjustment of each pixel.

5. The non-transitory machine readable medium of claim 4, wherein the set of instructions for determining the gamma adjustment value comprises a set of instructions for determining a luminance value of each pixel in the plurality of pixels of the digital image.

6. The non-transitory machine readable medium of claim 1, wherein the set of instructions for adjusting the full-grain image comprises a set of instructions for determining a weighted average of the digital image and the full-grain image based on the grain amount value.

7. The non-transitory machine readable medium of claim 6, wherein the grain amount value is received from a user.

8. A method for generating a grainy image, the method comprising:

receiving a digital image stored on the computing device;

displaying the digital image in an image viewing area;

receiving input of a value from a user that represents an ISO variable based on a film speed;

generating a pixel field based on dimensions of the received digital image and a seed value generated by the computing device;

generating a dynamic grain field by iterating through each of a plurality of pixels of the generated pixel field to blur and unsharpen the pixels according to the received ISO variable;

blending the dynamic grain field with the digital image stored on the computing device in order to generate a full-grain image;

adjusting the full-grain image based on a grain amount value to generate the grainy image; and displaying the generated grainy image in the image viewing area.

9. The method of claim 8, wherein generating the dynamic grain field comprises:

applying a blurring function to the generated pixel field; and applying an unsharp masking function to the blurred pixel field.

10. The method of claim 9, wherein settings for the blurring and unsharp masking functions are looked up in an interpolation table based on the received value that represents the ISO variable.

11. The method of claim 8, wherein blending the dynamic grain field with the digital image in order to generate the full-grain image comprises:

determining a gamma adjustment value for each pixel in a plurality of pixels of the digital image;

applying a gamma adjustment to a value of each pixel of the plurality of pixels of the digital image based on the gamma adjustment value;

adjusting the value of each pixel of the plurality of pixels of the digital image based on a grain amount of a corresponding location in the dynamic grain field; and inverting the gamma adjustment of each pixel.

12. The method of claim 8, wherein the pixel field is a random pixel field.

13. The method of claim 8, wherein adjusting the full-grain image comprises determining a weighted average of the digital image and the full-grain image based on the grain amount value.

14. A non-transitory machine readable medium storing sets of instructions that when executed by at least one processing unit of a computing device provides a graphical user interface (GUI) for generating a grainy image, the GUI comprising:

a display area for editing a digital image stored on the computing device; and a dynamic grain effect tool for:

receiving the digital image displayed in the display area;

receiving input of a value from a user that represents an ISO variable based on a film speed;

generating a pixel field based on a seed value generated by the computing device and dimensions of the received digital image;

generating a dynamic grain field by iterating through each of a plurality of pixels of the generated pixel field to blur and unsharpen the pixels according to the received ISO variable;

blending the dynamic grain field with the digital image stored on the computing device in order to generate a full-grain image; and adjusting the full-grain image based on a grain amount value to generate the grainy image, wherein the grainy image is displayed in the display area.

15. The non-transitory machine readable medium of claim 14, wherein the dynamic grain effect tool is for adjusting the full-grain image generate the grainy image by calculating a weighted average of the full-grain image and the digital image.

16. The non-transitory machine readable medium of claim 15, wherein the GUI further comprises:

a first user interface item for representing the grain amount, wherein the grain amount is used as a weight of the weighted average; and a second user interface item for representing the value that represents the ISO variable.

17. The non-transitory machine readable medium of claim 16, wherein the first and second user interface items are adjustable based on user-input.

18. The non-transitory machine readable medium of claim 14, wherein the grain field is further based on a value of each pixel in the digital image.

19. The non-transitory machine readable medium of claim 14, wherein the generation of the full-grain image comprises:

determining a gamma adjustment value for each pixel in a plurality of pixels of the digital image;

applying a gamma adjustment to a value of each pixel of the plurality of pixels of the digital image based on the gamma adjustment value;

adjusting the value of each pixel of the plurality of pixels of the digital image based on a grain amount of a corresponding location in the dynamic grain field; and inverting the gamma adjustment of each pixel.

* * * * *